(12) United States Patent
Wojciechowski

(10) Patent No.: US 7,474,393 B2
(45) Date of Patent: Jan. 6, 2009

(54) METHOD AND APPARATUS FOR DETERMINING A VERTICAL INTENSITY PROFILE ALONG AN ILLUMINATING BEAM

(75) Inventor: Joel C. Wojciechowski, c/o Biomed Solutions, LLC, 15 Schoen Pl., Pittsford, NY (US) 14534

(73) Assignee: Joel C. Wojciechowski, West Henrietta, NY (US)

( * ) Notice: Subject to any disclaimer, the term of this patent is extended or adjusted under 35 U.S.C. 154(b) by 0 days.

(21) Appl. No.: 11/773,205

(22) Filed: Jul. 3, 2007

(65) Prior Publication Data

US 2007/0279621 A1 Dec. 6, 2007

Related U.S. Application Data

(63) Continuation-in-part of application No. 11/224,621, filed on Sep. 12, 2005, now Pat. No. 7,239,379.

(60) Provisional application No. 60/608,894, filed on Sep. 13, 2004.

(51) Int. Cl.
*G01J 1/00* (2006.01)
(52) U.S. Cl. ............... 356/213; 356/121; 356/243.1
(58) Field of Classification Search ......... 356/121–123, 356/213–218, 399–401, 243.1–243.8
See application file for complete search history.

(56) References Cited

U.S. PATENT DOCUMENTS

| 3,598,493 | A | 8/1971 | Fisher |
| 3,748,975 | A | 7/1973 | Tarabocchia |
| 4,172,639 | A | 10/1979 | Lang et al. |
| 4,172,662 | A | 10/1979 | Vogel |
| 4,800,526 | A * | 1/1989 | Lewis .................... 365/118 |
| 6,778,323 | B2 | 8/2004 | Endo et al. |
| 6,847,490 | B1 | 1/2005 | Nordstrom et al. |
| 7,027,156 | B2 * | 4/2006 | Watts et al. ............ 356/401 |
| 7,042,556 | B1 | 5/2006 | Sun |

OTHER PUBLICATIONS

*Multiple Excitation Microscopy, MPE Tutorial*, Coherent Laser Group, Copyright 2000 Coherent, Inc., MC-SC14-2000-3M0500.
*How does a confocal microscope work?*, http://www.physics.emory.edu/~weeks/confocal/. Jan. 11, 2006.
*Laser Scanning Confocal Microscopy*, Molecular Expressions Microscopy Primer: Specialized Microscopy Techniques - Confocal Microscopy, http://microscopy.fsu.edu/primer/techniques/confocal/index.html, Nov. 10, 2005.

* cited by examiner

*Primary Examiner*—Hoa Q Pham
(74) *Attorney, Agent, or Firm*—Brian B. Shaw, Esq.; Stephen B. Salai, Esq.; Harter Secrest & Emery LLP

(57) ABSTRACT

An assembly is provided for the direct measurement of a vertical intensity profile through a plane of focus along an illuminating beam, a determination of a depth of the focal plane and a maximum intensity of the intensity profile. The assembly includes a plurality of focusing indicia fixed relative to a substrate, the focusing indicia being distributed at different locations along the illuminating beam. The focusing indicia are configured to be illuminated with an intensity corresponding to the position relative to the plane of focus along the axis of the illuminating beam. The location of the respective focusing indicia can be predetermined, such as along a given scale at a given inclination of the scale and the path of the illuminating beam, or not initially known and subsequently determined.

20 Claims, 8 Drawing Sheets

METHOD AND APPARATUS FOR DETERMINING A VERTICAL INTENSITY PROFILE ALONG AN ILLUMINATING BEAM

CROSS-REFERENCE TO RELATED APPLICATIONS

The present application is a continuation in part of U.S. Ser. No. 11/224,621 filed Sep. 12, 2005 now U.S. Pat. No. 7,239,379, which claims the benefit of U.S. application 60/608,894 filed Sep. 13, 2004, the disclosure of each of which is hereby expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention is generally related to determining an intensity profile along an illuminating beam and, more particularly, to an apparatus and method for the direct measurement of a variable vertical intensity profile through a plane of focus and hence a determination of a depth of a focal plane and a maximum intensity of the intensity profile.

2. Description of Related Art

There are a multitude of applications where it is desirable to determine an intensity profile or degree of focus through a plane of focus or a plurality of different focal planes. In one instance it is measure properties of a sample via a confocal microscope. The roughness of a surface, the curvature of the surface and the height of 'steps' on the surface are typical applications for a confocal microscope. In biomedical research, there is tremendous growth in the use of confocal microscopy. However, there is a need in the art for a more precise means to aid in determining the distance between the cells in a tissue, or organelles in a cell being observed using the confocal microscope.

Another rapidly growing area in the semiconductor industry, is the use of 'bumps' or other three dimensional features that protrude outwardly from the wafer or substrate. The manufacturers, processors, and users of such wafers or like substrates having bumps or other three dimensional features desire to inspect these wafers or like substrates in the same or similar manner to the two dimensional substrates. The manufacturers of semiconductors have made vast improvements in end-product quality, speed and performance as well as in manufacturing process quality, speed and performance. However, there continues to be a demand for faster, more reliable and higher performing semiconductors. However, many obstacles exist, such as a significant height of bumps or the like, which causes focusing problems, shadowing problems, and general depth perception problems. A further need exists in the area of three dimensional imaging, wherein the three dimensional image is constructed from a plurality of image taken at differing focal planes. Many of the current systems, devices, apparatus and methods are either completely insufficient to handle those problems or cannot satisfy the speed, accuracy, and other requirements.

Thus, an unaddressed need exists in the art to overcome the aforementioned deficiencies and inadequacies.

BRIEF SUMMARY OF THE INVENTION

The present invention provides a determination of a variable intensity profile along an illumination beam, wherein a resulting intensity profile or degree of focus can be determined from illuminating a plurality of focusing indicia disposed along the illuminating beam. IN one configuration, the intensity profile lies through a confocal plane, as well as a direct method of measurement, thereby offering the observer valuable information about the microscopic system.

One configuration of the present invention can provide (1) measuring the performance of a confocal microscope, (2) comparing performance between different confocal microscopic systems, and (3) increasing quantitative resolution of three-dimensional constructions using the confocal microscope.

The present invention directly measures a vertical intensity profile of a focal plane (confocal slice) on a confocal microscope. From this measurement, a determination of a depth of the confocal slice can be made.

The present invention encompasses a transparent substrate having an embedded vertical scale (such as a micrometer) offset (inclined) at a precise angle with respect to the z-axis. Observation of the scale yields a direct visualization of the variable intensity profile through the plane of focus (confocal plane), providing valuable information including a depth of the confocal plane, a maximal intensity, and shape of the intensity profile.

Embodiments of the present invention provide an apparatus and method for measuring the depth of field or a depth of the confocal slice of a specimen on a confocal microscope.

In a further configuration, the apparatus includes a transparent substrate such as a glass microscope slide in which is imbedded a graduated length of a ruler or distance meter (scale) that is offset at an angle to an illuminating beam passing through the substrate. The distance meter or length of a graduated ruler (scale) can be painted, dyed such as fluorescently dyed or of a material to illuminate within an absorption frequency relevant to the illuminating beam (the light source of the microscope). The depth of field or the depth of the confocal slice can be obtained by reading the change in the Z direction on the graduated scale.

Determination of the depth of the confocal plane (confocal slice) of the microscope, and hence of a specimen, uses an algorithm employing trigonometric functions resulting in measurement of the confocal depth in the Z direction.

It is also contemplated, a plurality of focusing indicia can be located, either randomly or predeterminedly, along an illuminating beam having a focal plane, wherein the illuminate focusing indicia provide an intensity profile or degree of focus with respect to the focal plane.

Other systems, methods, features, and advantages of the present invention will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEWS OF THE DRAWING(S)

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
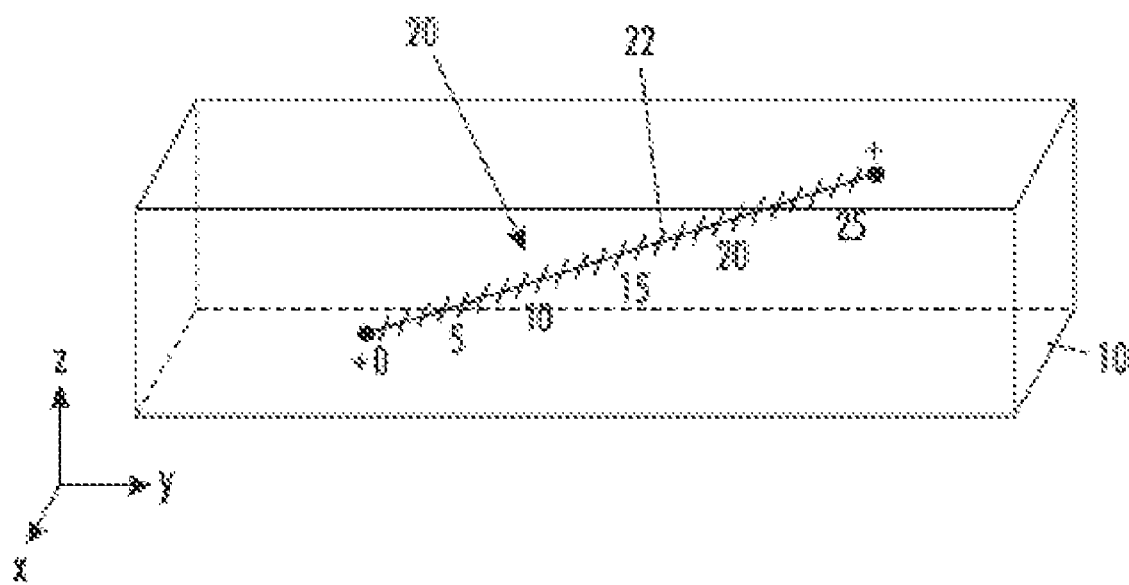
FIG. 1 is a perspective view of an embodiment of the invention.

The present system contemplates a substrate 10 having a plurality of a plurality of focusing indicia 16 fixed relative to the substrate, the focusing indicia being distributed at different locations along an intersecting illuminating beam 40, wherein each of the focusing indicia provide a corresponding signal in response to illumination by a focal plane of the illuminating beam. The corresponding signal can be an intensity profile such as for fluorescent conditions and a degree of focus for non-fluorescent conditions.

The substrate 10 can be transparent, translucent or opaque. Thus, the substrate 10 can be formed of any of a variety of materials including but not limited to glass, metals, composites or alloys as well as laminates or homogeneous or heterogeneous compositions. A typical transparent substrate 10 is a glass microscope slide. However, it is understood the transparent substrate 10 can be any of a variety of optically transparent materials, including glasses, fused silicas or borosilicas, plastics, gels and even contained thixotropic materials.

The focusing indicia 16 are selected to create or generate a signal image or data corresponding to illumination by a focal plane of the illuminating beam 40. The focusing indicia 16 can be fluorescent upon illumination by the illuminating beam 40, or merely visible or non-fluorescent. The focusing indicia 16 can be a scale or meter 20. Alternatively, the focusing indicia 16 can be a plurality of separate and discrete elements 30, such as beads or spheres as well as non-spheroidal indicia such as rods or micro-rods, wherein the focusing indicia are disposed relative to the substrate in predetermined positions or "random" but fixed positions. The size of the individual focusing indicia 16 is at least partially determined by the intended operating parameters and resolution of the system. For example, for fluorescing focusing indicia 16 a size of approximately 0.5 microns has been found satisfactory. However, it is understood the focusing indicia 16 could be formed of quantum dots, nano tubes or nano rods. However, for lower resolution applications, the focusing indicia 16 may have a dimension on the order of 5 microns or larger. Typically, the focusing indicia 16 are sized on the order of the wavelength of the illuminating beam 40. Further, the focusing indicia 16 are selected to sufficiently distinguish from the adjacent material of the substrate 10 to provide a signal or signature corresponding to the illumination from the illuminating beam. That is, sufficient intensity of the individual focusing indicia 16 to provide resolution of the individual indicia is generated in response to illumination from the illuminating beam 40.

In one configuration, the assembly includes a transparent substrate 10 and a graduated length of ruler, a distance meter or scale 20.

For purposes of disclosure, the substrate is disposed in the optical path of a confocal microscope. As is known in the art, the confocal microscope typically uses a Nipkow disc or a laser to produce point-probing raster scanning, yielding images of a specimen (or the present assembly) with very high contrast in the third dimension. A small aperture at the secondary focus of the objective lens narrows the depth of focus and obstructs most of the light reflected from out-of-focus object. Thus, the microscope includes an illuminating beam 40, such as a coherent beam or laser. The illuminating beam 40 travels along an illuminating axis. The illuminating axis is typically formed of a plurality of linear segments. It is understood the confocal microscope encompasses a variety of microscope technologies including but not limited to two-photon or multiphoton microscopes. U.S. Pat. No. 6,909,542 issuing June 21, 20 to Sasaki and U.S. Pat. No. 3,013,467 to Minsky are hereby incorporated by reference.

Figure 5:
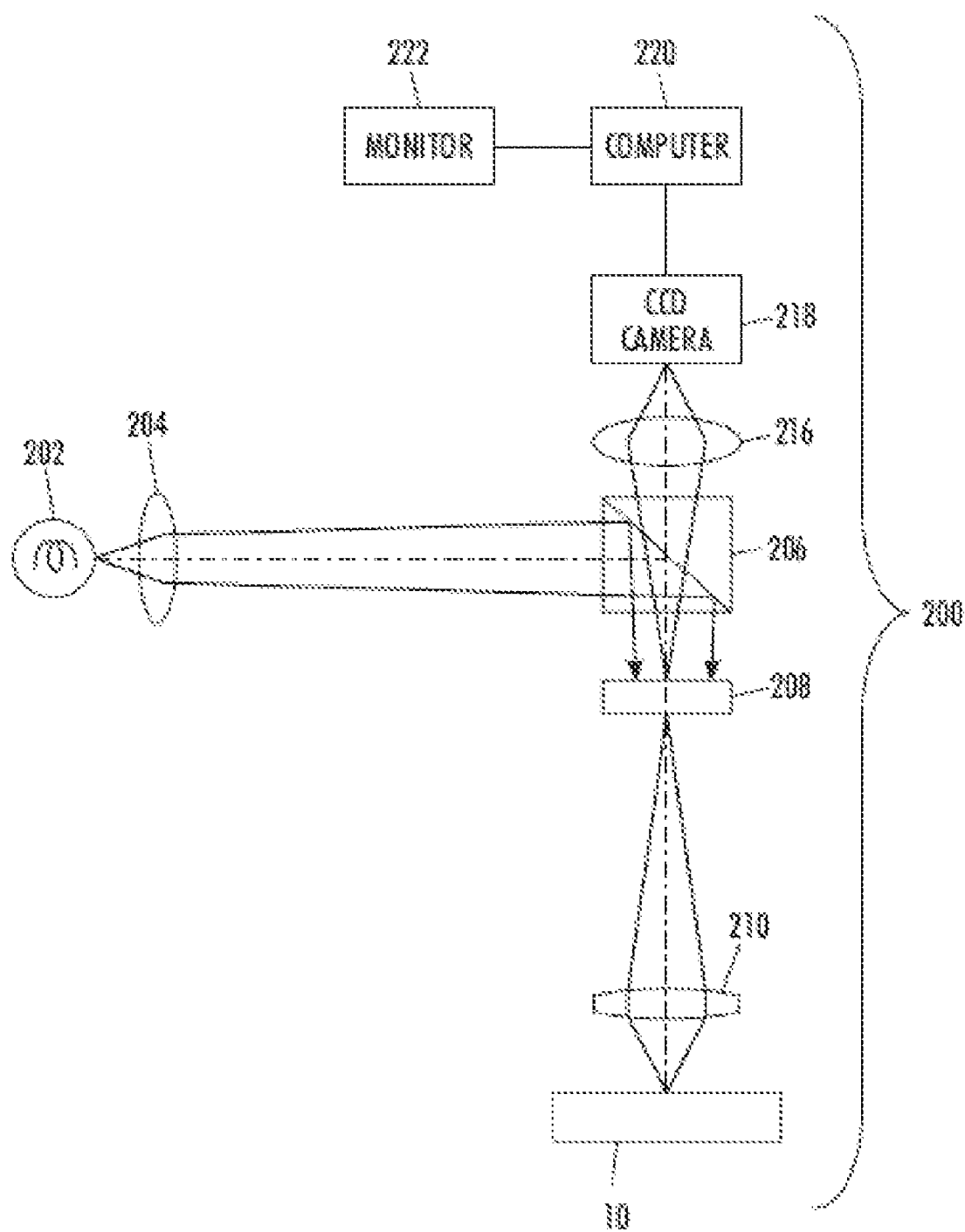
FIG. 5 is representative confocal microscope incorporating the present invention.
Figure 6:
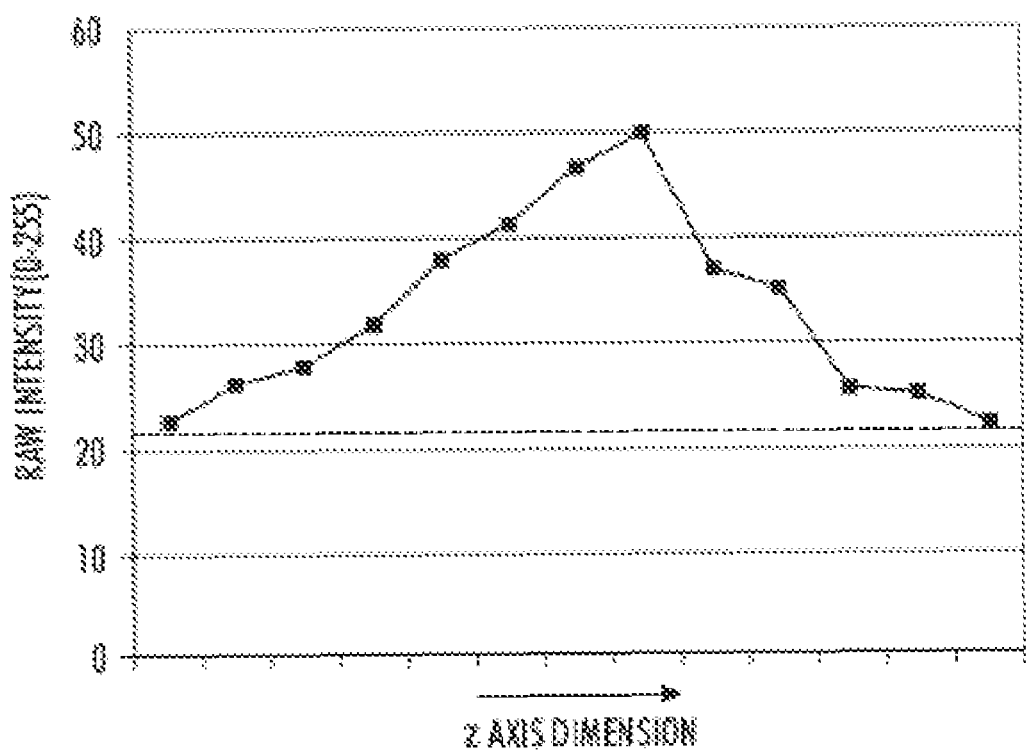
FIG. 6 is a representative intensity profile for a given assembly and location.
Figure 7:
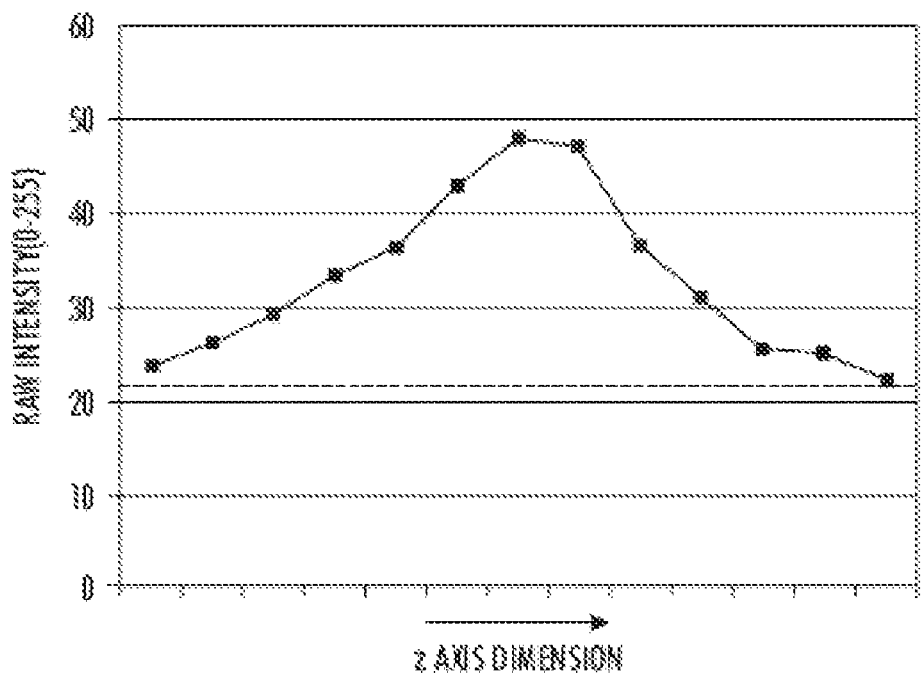
FIG. 7 is a further representative intensity profile for a given assembly and location.
Figure 8:
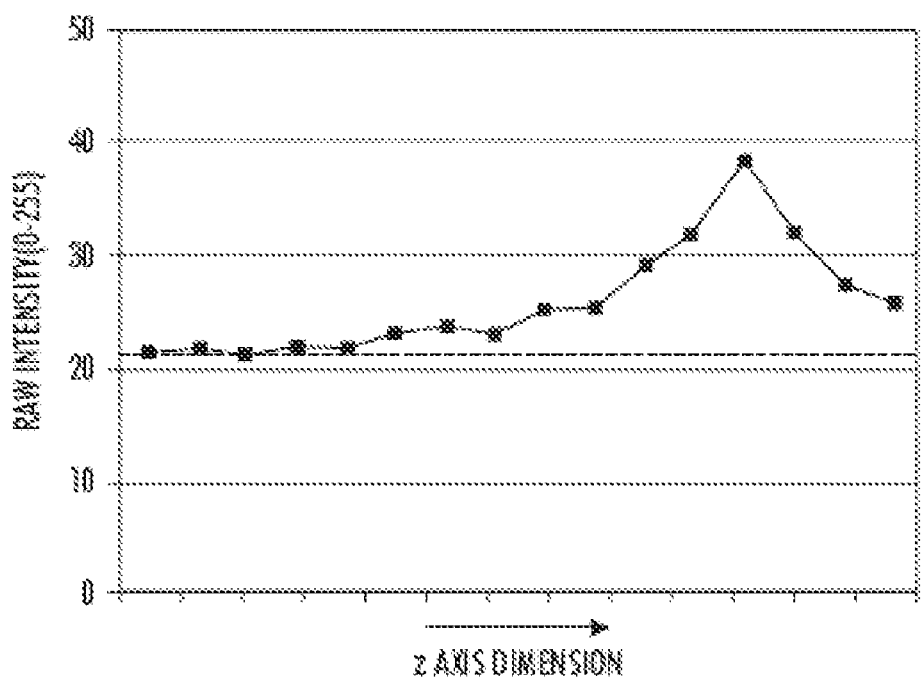
FIG. 8 is another representative intensity profile for a given assembly and location.
Figure 9:
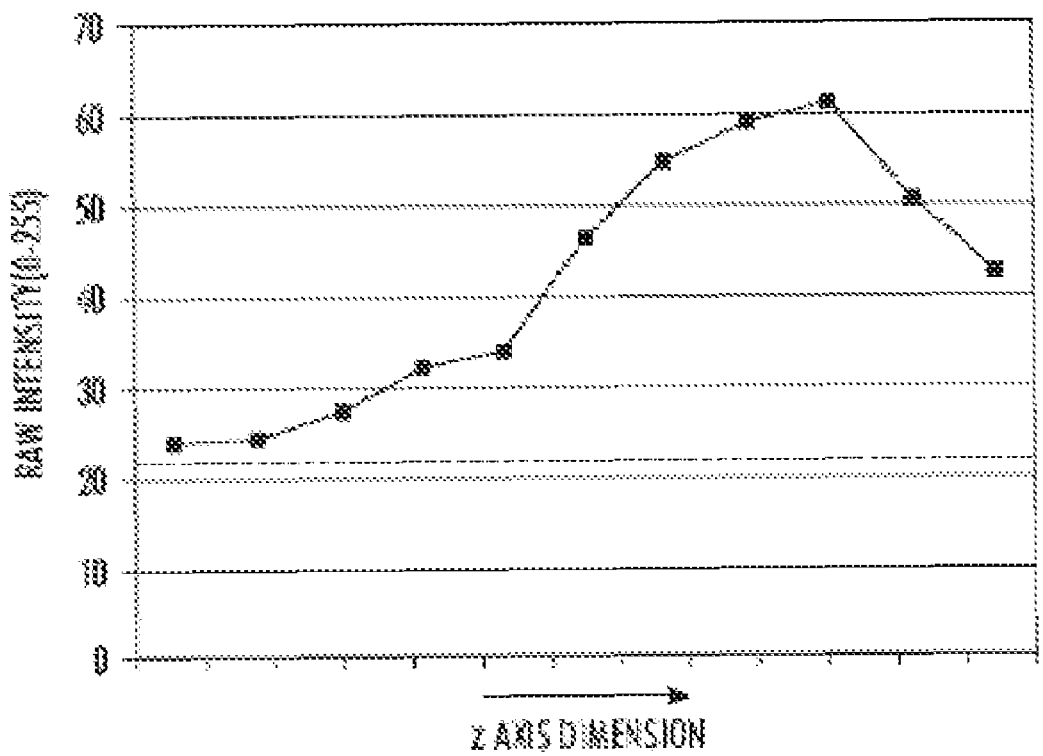
FIG. 9 is an additional representative intensity profile for a given assembly and location.
Figure 10:
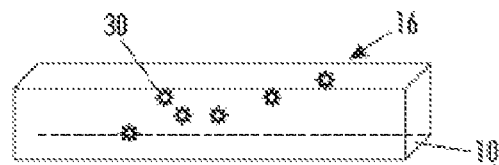
FIG. 10 is a schematic perspective view of an alternative configuration of a substrate incorporating a plurality of focusing indicia.
Figure 11:
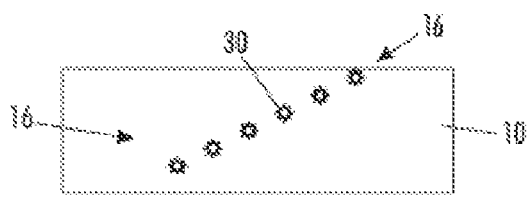
FIG. 11 is a side elevational schematic view of the configuration of FIG. 10.

Specifically, referring to FIG. 5, a representative confocal microscope 200 includes an optical lens 204 and half mirror 206 arranged on the optical path of a beam of light (illuminating beam 40) emitted from a light source 202. The light source 202 can be a halogen light source, a mercury light source, a solid state light source such as a light emitting diode or a coherent light source. A pinhole 208, an objective lens 210 and the substrate 10 (with the scale 20) are arranged on the optical path (axis) of the light beam reflected by the half mirror 206. The illuminating beam reflected by the scale 20 in the substrate 10 is made to enter a CCD camera 218 through the objective lens 210, the pinhole 208, the half mirror 206 and a condenser lens 216. The images output from the CCD camera 218 are stored in a computer 220.

The transparent substrate 10 which incorporates the scale 20 can be any of a variety of substrates, wherein the substrate can have a planar surface or a pair of parallel planar surfaces orthogonal to the illumination path (the illuminating beam) of the confocal microscope. The transparent substrate 10 is transparent to the respective illuminating beam 40 of the confocal microscope or a separate sensing beam used in conjunction with the scale 20.

In the microscope slide configuration, the index of refraction of the transparent substrate 10 is approximately identical to that of the specimen previously or subsequently imaged in the microscope. The proximity of the index of refraction of the transparent slide to the index of refraction of the specimen enhances the accuracy of the resulting measurements and the estimation of the depth of field. It is further contemplated that the transparent substrate 10 has a similar index of refraction and absorption coefficient as the specimen. It is advantageous for the index of refraction of the transparent substrate 10 to be within approximately 25% of the index of refraction of the specimen, and more advantageously to be within 10% and even with 5%, to less than 2%.

The scale 20 includes a plurality of spaced indicia or markings 22 extending along a longitudinal dimension in a given plane. In one construction, the markings are equally spaced along the scale 20. The scale 20 is fixed relative to the transparent substrate 10 so as to be non-perpendicular to an intersecting portion of the illuminating beam (optical path) by an offset angle θ. Typically, the plane in which the scale 20 lies is non-orthogonal to the z axis. Thus, the scale 20 is inclined relative to the local portion of the illuminating beam (illuminating axis) of the confocal microscope. It is understood the scale 20 can be a linear element which intersects the illuminating beam (illuminating axis), however the scale can be a curvilinear element which locates markings 22 at different positions relative to the z-axis (the illuminating beam). Thus, the scale 20 locates the markings 22 at differing positions relative to the z-axis. In one configuration, the scale 20 is embedded within the transparent substrate 10. That is, the scale 20 is entirely within the material of the transparent substrate 10. However, it is understood a portion of the scale 20 can be disposed at or adjacent a surface of the transparent substrate 10.

It has been found advantageous for the offset angle θ to be a predetermined or known angle. However, it is understood the offset angle θ can be measured or determined subsequent to fixing the scale 20 relative to the transparent substrate 10.

The scale 20 is advantageously illuminated by the illuminating beam or a separate sensing beam. That is, the visibility or readability of the scale 20 corresponds to the energy received from the illuminating beam, and the energy received from the illuminating beam corresponds to the location within the confocal plane. In one configuration, the scale 20 is fluorescently dyed to illuminate with an absorption frequency corresponding to the microscope light source.

Figure 2:
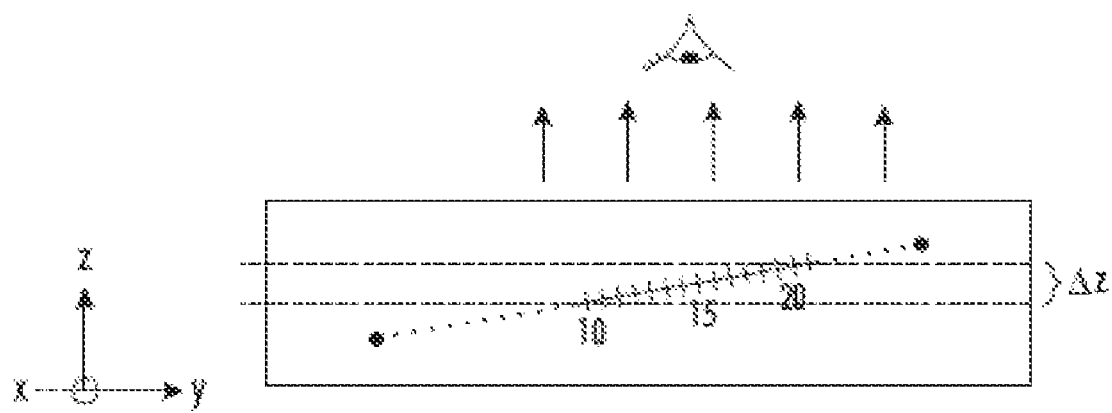
FIG. 2 is a view along the x-axis of the embodiment illustrated in FIG. 1.

As seen in FIG. 2, only a portion of the scale 20 is shown as illuminated by the illuminating beam. That is, only a portion of the scale 20 is within the depth of field (focal plane) of the confocal microscope. In FIG. 2, the light rays pass upward to the objective of the confocal microscope. As seen in FIG. 2, Δz corresponds to the depth of field (the depth of the confocal slice) or the dimension of the confocal plane along the z-axis.

Figure 3:
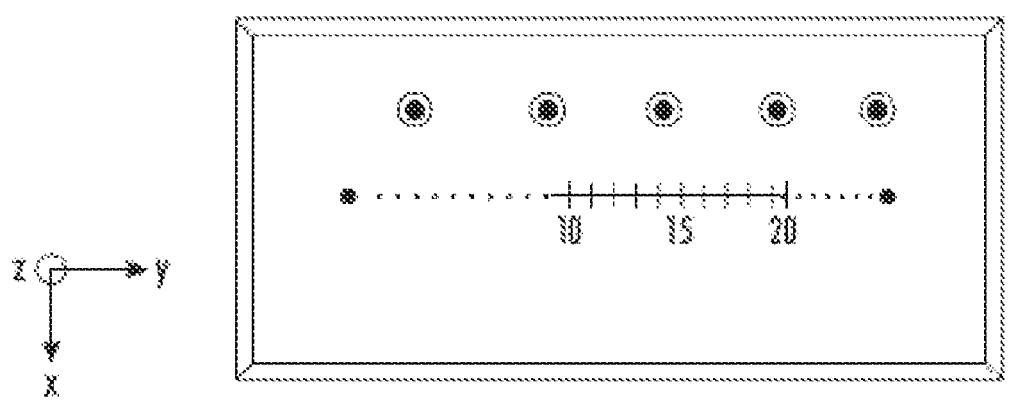
FIG. 3 is a view along the z-axis of the embodiment illustrated in FIG. 1.

Referring to FIG. 3, the light rays to the objective extend upwards out of the page. FIG. 3 is representative of the image of the present apparatus as operably located within the illuminating beam along the illuminating path. The intensity profile from which the depth of field is determined is obtained by reading the illuminated range of the scale 20.

In one configuration the transparent substrate 10 is positioned in a plane orthogonal to the intersecting portion of the illuminating beam. As previously stated, the depth of field or the change in the Z direction is obtained by reading the gradations of the scale 20.

Generally, the scale 20 remains stationary (fixed) relative to the transparent substrate 10, and hence relative to the confocal plane. The scale 20 glows or emits light at various intensities along the length of the scale, the intensity being dependent upon where the respective portion of the scale lies within the confocal plane—or conversely where the confocal plane lies relative to the fixed scale 20. Thus, an intensity profile or distribution is created from the scale 20.

From the intensity distribution along the scale 20, the present invention further provides for the determination of the depth of the confocal slice (the dimension of the confocal plane along the z-axis).

The intensity profile from the illuminated scale 20 can be read and recorded by any of a variety of mechanisms, such as but not limited to optical sensors, charge-coupled devices 218, films, light sensors or the like.

Figure 4:
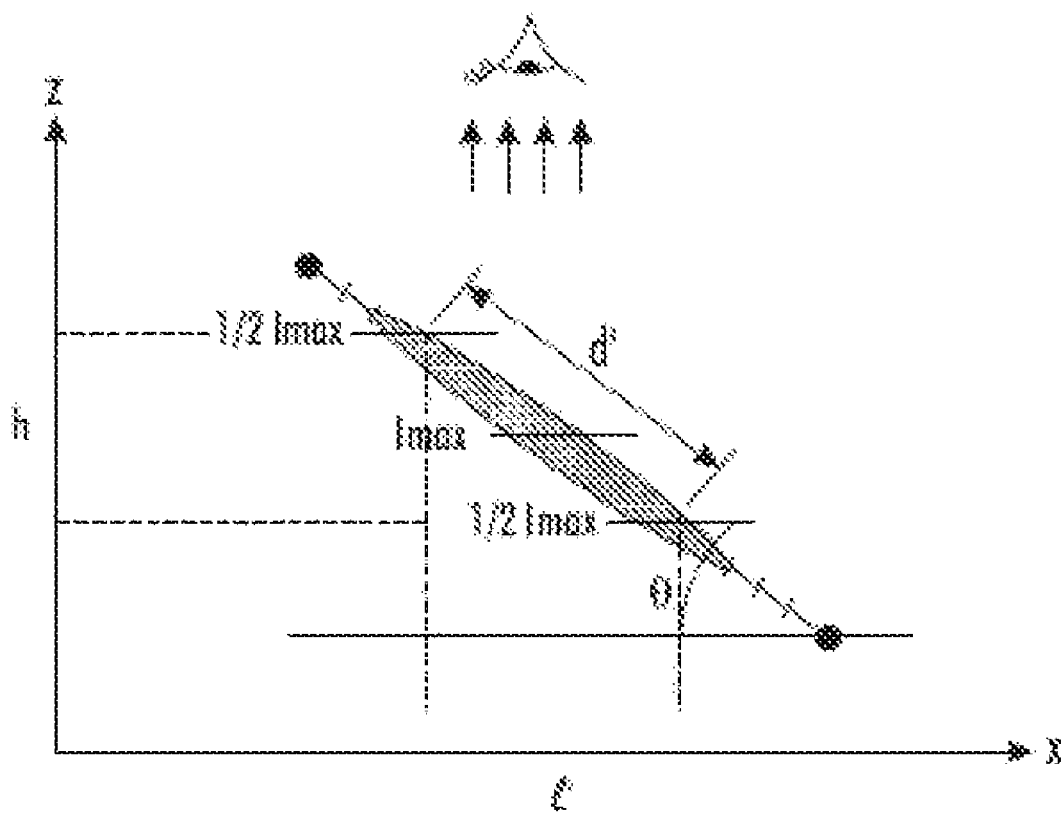
FIG. 4 is a schematic cross section for determining a confocal depth.

A preferred method for determining the dimension of the confocal plane along the z-axis (the confocal slice or confocal depth) of the microscope (and thus the specimen) uses the following algorithm and the diagram as illustrated in FIG. 4:

l'=d' cos θ; then d'=l'/cos θ.

From FIG. 4, h'=d' sin θ substituting for d' then h'=(l'/cos θ) sin θ h'=l' (sin θ/cos θ), which can be rewritten as:

h'=l' tan θ, where l' is the observed distance by an observer along the z-axis, d' is the actual distance along the scale 20 and h' is the actual dimension of the defined confocal plane along the z-axis.

Using the algorithm, the pixels in a two-dimensional region of interest are scanned. The $I_{max}$ intensity is determined as well as a baseline intensity. The range is equal to the determined $I_{max}$ minus the baseline (minimal) intensity ($I_{max}-I_{min}$). One-half of the range is then determined. Next, the pixel distance is determined, converted to micrometers and multiplied by two in order to get the full confocal dimension along the z-axis (depth). Such full confocal depth is the l' designated in FIG. 4. l' is then multiplied by the tangent of the angle θ as designated in FIG. 4 to determine the true confocal depth, h'.

However, it is understood that alternative definitions of the depth of the confocal plane can be employed. That is, the present description is based on a definition of the confocal plane being twice the distance from half the intensity maximum to the intensity maximum ($I_{max}$), i.e. from half the $I_{max}$X on one side of the intensity profile to the other half $I_{max}$ on the other side. Alternative definitions of the confocal plane can be employed, such as from 10% of the $I_{max}$ to 90%, or 20% of the $I_{max}$ to 80% up to 40% of the $I_{max}$ to 60%. Referring to FIGS. 6, 7, 8 and 9, representative intensity profiles along the z-axis at a given point (X,Y) for a given assembly or specimen are shown. In accordance with the preceding algorithm, the dimension of the confocal plane along the z-axis can be determined from the corresponding intensity profile.

It is further contemplated the intensity profile may not be symmetrical intensity profile about $I_{max}$. The symmetry of the intensity profile can be assessed by comparing one half of $I_{max}$ about each side of $I_{max}$. In such instance, the respective portion of the intensity profile can be weighted or compensated, as dictated by the nonlinearity and the desired degree of accuracy.

Figure 14:
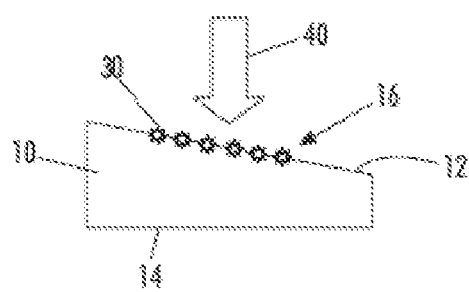
FIG. 14 is a side elevational schematic view of another substrate configuration.

Although the scale 20 is set forth as embedded within the transparent substrate 10, it is contemplated the substrate can be alternatively configured to locate the focusing indicia 16 along the illuminating beam 40. As seen in FIG. 14, the substrate 10 can include two surfaces 12, 14 which intersect the illuminating beam 40, wherein at least one of the surfaces is inclined or non-perpendicular to the illuminating beam. Thus, the focusing indicia 16 can be disposed along the surface of the substrate 10, yet be disposed at different positions along the illuminating beam 40. It is understood this construction can be employed with a transparent translucent or opaque substrate 10.

In use, the assembly of the transparent substrate 10 with the embedded scale 20 is operably located in the confocal microscope before and/or after a specimen is operably located and imaged by the confocal microscope. For example, the given specimen is imaged by the confocal microscope 200, subsequently the assembly of the transparent substrate 10 with the embedded scale 20 is located in the path of the illuminating beam (in place of the specimen), the scale is then illuminated and the resulting intensity profile is measured or recorded.

The present system allows for a relatively rapid determination of the illumination intensity profile of the confocal plane in the confocal microscope (and hence dimension of the confocal plane along the z-axis) with no dependency upon movement through the confocal plane or the mechanics of a movable transparent substrate 10, such as the microscope stage.

Figure 13:
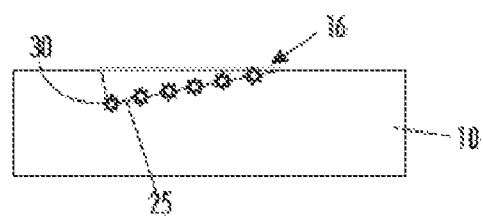
FIG. 13 is a side elevational cross sectional view of a further configuration of the substrate.

In a configuration employing an opaque substrate 10, the focusing indicia 16 are disposed at a surface of the substrate which intersects the illuminating beam 40. The surface of the substrate 10 can be substantially uniform or planar, wherein the surface 12 or 14 is inclined relative to the illuminating beam 40, as previously set forth. Alternatively, in the opaque substrate 10, the focusing indicia 16 can be locally recessed within the surface 12 to be disposed at different locations along the illuminating beam 40. For example, referring to FIG. 13, the focusing indicia 16 can be etched into a local region 25 of the surface of the substrate 10. The recessed region 25 of the substrate 10 can be within the field of the illuminating beam 40 and/or the field under examination.

Figure 12:
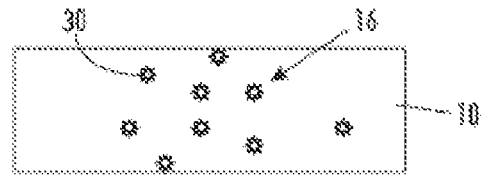
FIG. 12 is a side elevational schematic view of a further configuration of a substrate incorporating a plurality of focusing indicia.

For those focusing indicia 16 randomly disposed relative to or within the substrate 10 as seen in FIG. 12, the intensity profile, or degree of focus is measured, thereby providing a relative positioning of the focusing indicia. An absolute position of at least one of the focusing indicia 16 is then determined. This determination can be provided by a separate calibrated scale or the apparatus employing the present system includes an absolute measurement capacity. Alternatively, at least one of the focusing indicia 16 can be located at a predetermined position, and the position of the remaining indicia determined from the respective relative position to the located indicia.

In the determination of the degree of focus, when a pattern is moved out of focus, it loses energy first in its high spatial frequencies and then in progressively lower spatial frequency components. This is manifested as a loss of contrast in the corresponding spatial frequency bands. In the decomposition, loss of focus results in reduced amplitude of the individual band pixel values. In a simple implementation, for a given composite decomposition level, the corresponding source decomposition level that is most in-focus can be identified as that which has the highest absolute value. The final composite is obtained simply through the coarse-to-fine synthesis process of each selected level. Further, in determining a degree of focus, one or more focus quality metrics including, but not limited to, Laplacian energy, image variance, and gradient energy can be considered. The degree of focus is well known to those of ordinary skill in the art, as set forth in U.S. Pat. Nos. 6,252,979; 6,970,789; 4,769,530; 4,542,289; 5,995,143 and 5,773,810 each of which is hereby expressly incorporated by reference.

Depending upon the desired use of the measured intensity profile and the particular focusing indicia 16, the illuminating beam 40 can be any of a variety of electromagnetic radiations including but not limited to visible, infra-red, ultraviolet or X-rays.

For a given position of the focal plane of the illuminating beam 40, a signal corresponding to each of the focusing indicia 16 is generated as the illuminating beam intersects the focusing indicia 16. For fluorescing focusing indicia 16, the signal is an intensity profile, and for non-fluorescing focusing indicia 16, the signal is a degree of focus.

Thus, the system can be used in microscopy, such as but not limited to confocal or multi-photon, total internal reflection microscopy or traditional microscopy for determining a depth of focus. It is also contemplated the system can be used outside of microscopy, such as in diagnostics or device calibration. Further, the present system can be employed to reconstruct a plurality of images or slices of a target based on the intensity profile of the focusing indicia 16 associated with a given image or slice. From the distribution of focusing indicia 16, a composite image can be constructed.

It should be emphasized that the above described embodiments of the present invention, particularly, any preferred embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for use in measuring an intensity profile along an illuminating beam, comprising:
    (a) a substrate located in the illuminating beam; and
    (b) a plurality of focusing indicia fixed relative to the substrate, the
    focusing indicia being distributed at different locations along the illuminating beam, each focusing indicia providing a corresponding signal in response to illumination by the illuminating beam at a given focal plane.

2. The apparatus of claim 1, wherein the substrate is transparent.

3. The apparatus of claim 1, wherein the substrate is opaque.

4. The apparatus of claim 1, wherein the substrate is translucent.

5. The apparatus of claim 1, wherein the plurality of focusing indicia are disposed on a surface of the substrate.

6. The apparatus of claim 1, wherein the plurality of focusing indicia are disposed at predetermined locations with respect to the substrate.

7. The apparatus of claim 1, wherein the plurality of focusing indicia are disposed at random locations within the substrate.

8. The apparatus of claim 1, wherein the substrate includes an exposed surface non-perpendicular to the illuminating beam.

9. The apparatus of claim 1, wherein the focusing indicia are beads.

10. The apparatus of claim 1, wherein the focusing indicia fluoresce.

11. The apparatus of claim 1, wherein the focusing indicia are reflective.

12. The apparatus of claim 1, wherein the corresponding signal is an intensity profile.

13. The apparatus of claim 1, wherein the corresponding signal is a degree of focus.

14. A method for use in determining an intensity profile along an illuminating beam, the method comprising:
    (a) fixing a plurality of focusing indicia relative to a substrate in an illuminating beam, the focusing indicia being disposed at different positions along the illuminating beam; and
    (b) measuring an intensity profile of the illuminated focusing indicia.

15. The method of claim 14, further comprising fluorescing the focusing indicia.

16. The method of claim 14, further comprising fixing the focusing indicia on a surface of the substrate.

17. The method of claim 14, further comprising passing the illuminating beam through a surface of the substrate, the surface of the substrate being non-perpendicular to the illuminating beam.

18. The method of claim 14, further comprising illuminating the focusing indicia with an evanescent wave.

19. The method of claim 14, further determining a depth of focus along the illuminating beam corresponding to the measured intensity profile.

20. The method of claim 14, wherein measuring an intensity profile includes determining a degree of focus.

\* \* \* \* \*